United States Patent
Rang et al.

(10) Patent No.: US 7,519,782 B2
(45) Date of Patent: Apr. 14, 2009

(54) RING OPTIMIZATION FOR DATA SIEVING WRITES

(75) Inventors: Anton B. Rang, Houlton, WI (US); Andrew B. Hastings, Eagan, MN (US)

(73) Assignee: Sun Microsystems, Inc., Santa Clara, CA (US)

( * ) Notice: Subject to any disclaimer, the term of this patent is extended or adjusted under 35 U.S.C. 154(b) by 281 days.

(21) Appl. No.: 11/510,336

(22) Filed: Aug. 24, 2006

(65) Prior Publication Data

US 2008/0052475 A1    Feb. 28, 2008

(51) Int. Cl.
*G06F 13/14* (2006.01)
(52) U.S. Cl. .............................. 711/154; 711/155
(58) Field of Classification Search ................. None
See application file for complete search history.

(56) References Cited

U.S. PATENT DOCUMENTS 6,687,764 B2 *  2/2004  Sonoda et al. ................. 710/6

OTHER PUBLICATIONS

Thakur, Rajeev, et al., "Data Sieving and Collective I/O in ROMIO," Proc. of the 7th Symposium on the Frontiers of Massively Parallel Computation, Feb. 1999, pp. 182-189.
Thakur, Rajeev, et al., "Passion Runtime Library for Parallel I/O," Scalable Parallel Libraries Conference, Oct. 1994, 10 pages.

* cited by examiner

*Primary Examiner*—Hyung S Sough
*Assistant Examiner*—Ngoc V Dinh
(74) *Attorney, Agent, or Firm*—Dorsey & Whitney LLP

(57) ABSTRACT

In one embodiment, a method and apparatus for ring optimization for data sieving writes is disclosed. The method includes dividing a file range to be written to via a data sieving write operation into N groups, where N is greater than or equal to a number of processes writing to the memory, determining an offset assigned to each process, the offset being a distance from a beginning of the file range at which each process starts its writing, simultaneously writing by each process to the group of the file range determined by the associated offset of each process, and moving, by each process, to the next available subsequent group when a process completes the writing. Other embodiments are also disclosed.

17 Claims, 4 Drawing Sheets

RING OPTIMIZATION FOR DATA SIEVING WRITES

FIELD OF INVENTION

An embodiment of the invention relates to parallel input/output performed by computer applications, and more specifically, to a ring optimization for data sieving writes.

BACKGROUND OF INVENTION

A parallel application that includes several processes may perform input/output (I/O) collectively and in parallel. Frequently, the collective I/O may read or write an entire file, although each process accesses only a subset of the file contents. In some cases, the subset of the file accessed by one process may be interleaved with the subsets accessed by other processes. Further, the data may be arranged in memory for processing differently than in the file. Because of the potential complexity of data rearrangement and the need to synchronize the operation of multiple processes, it can be difficult to complete a collective I/O operation quickly.

One solution to this problem is data sieving. Data sieving is a way of combining multiple I/O requests into one request so as to reduce the effect of high I/O latency time. Data sieving for reads involves each process independently reading large blocks from a file and extracting its own relevant data. For writes, each process participating in the data sieving must lock a range of the file (gaining exclusive access), read the previous file contents in that range, insert its own data, write the updated data to the file, and release the lock. These steps are repeated by each process until the entire file range being collectively written has been updated. The locking required limits parallelism, and hence the speed at which the file can be written, because other processes will not be able to access that portion of the file until the lock is released.

A mechanism to reduce lock contention and improve the speed of parallel writes to a file by reducing the amount of time that multiple processes utilizing a data sieving algorithm are trying to update the same range within a file would be beneficial.

SUMMARY OF INVENTION

The present invention includes novel methods and apparatus for ring optimization for data sieving writes.

According to one embodiment of the invention, a method is disclosed. The method includes dividing a file range to be written to via a data sieving write operation into N groups, where N is greater than or equal to a number of processes writing to the memory, determining an offset assigned to each process, the offset being a distance from a beginning of the file range at which each process starts its writing, simultaneously writing by each process to the group of the file range determined by the associated offset of each process, and moving, by each process, to the next available subsequent group when a process completes the writing.

According to another embodiment of the invention, an apparatus is disclosed. The apparatus includes one or more processes accessing a file range via a collective input/output (I/O) data sieving algorithm and an interface to a file. The interface to the file is further to: divide the file into N groups, where N is greater than or equal to a number of the one or more processes writing to the file; determine an offset assigned to each process, the offset being a distance from a beginning of the file at which each process starts its writing; simultaneously write by each process to the group of the file determined by the associated offset of each process; and move, by a process, to the next available subsequent group when the process completes its writing.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
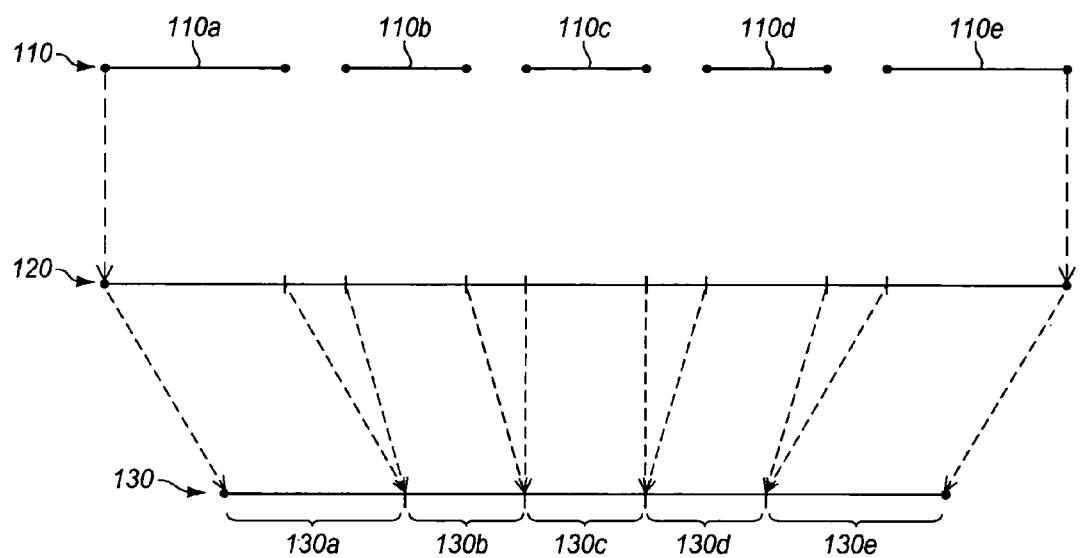
FIG. 1 is a block diagram illustrating one embodiment of data sieving and collective I/O in parallel computing applications.

A method and apparatus are described for ring optimization for data sieving writes. According to one embodiment, the method includes dividing a file range to be written to via a data sieving write operation into N groups, where N is greater than or equal to a number of processes writing to the memory, determining an offset assigned to each process, the offset being a distance from a beginning of the file range at which each process starts its writing, simultaneously writing by each process to the group of the file range determined by the associated offset of each process, and moving, by each process, to the next available subsequent group when a process completes the writing.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD- ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Embodiments of the invention introduce a novel method for ring optimization for data sieving writes. The ring optimization presented in embodiments of the invention reduces lock contention, and hence improves the speed of parallel writes to a file, by reducing the amount of time that multiple processes are trying to update the same range within a file. This allows for more parallelism and faster writes to a file when a data sieving algorithm is used.

FIG. 1 is a block diagram illustrating one embodiment of data sieving and collective I/O in parallel computing applications. In some embodiments, the parallel computing applications utilize the Message Passing Interface (MPI) programming interface, and more specifically utilize the MPI-IO programming interface. Parallel computing applications typically access a large number of small, non-contiguous pieces of data from a file. For good I/O performance, the size of an I/O request should be large. Otherwise, the I/O performance suffers considerably if applications access data by making many small I/O requests to access only a single contiguous chunk of data at a time.

To reduce the effect of high I/O latency, it is important to make as few requests to the file system as possible. A data sieving algorithm may be utilized to accomplish this purpose. With reference to FIG. 1, assume that an application has made a single write request to update five non-contiguous pieces of data represented by line 110. The five non-contiguous pieces of data are represented by 110a through 110e.

Instead of writing each piece 110a-110e separately, a data sieving algorithm reads a single contiguous chunk of data 120 starting from the first requested byte up to the last requested byte into a temporary buffer in memory. Then, it replaces the requested portions 130a-130e in the temporary buffer from the applications' buffer 130. If the application contains multiple processes, the portion of the file being accessed must also be locked during this read-modify-write operation to prevent concurrent updates by other processes.

In the case of a collective I/O operation, many parallel applications may need to access several non-contiguous portions of a file. In such a situation, the requests of different processes are often interleaved 110a-110e and may together span the large contiguous portion of the file 120. A collective I/O operation can improve I/O performance by merging the requests of different processes and servicing the merged request via the data sieving algorithm.

For instance, 110a, 110c and 110e might be written by a first process; 110b and 110d might be written by a second process. Each of these processes would read the single contiguous chunk of data 120 into their temporary buffer, update it from their application buffer 130, and write the data 120 back to the file. To ensure that the updates are made correctly, each process would lock the range 120 before the read, unlocking it only after the write. This limits the range 120 to being updated by a single process at a time.

Typically, the amount of data being written exceeds the maximum size of the temporary buffer. In this case, the range being updated will be divided into ranges according to the temporary buffer size (with their offset and size typically rounded to match I/O alignment requirements). For instance, the portion of the file from 110a through the end of 110c might be contained in one range, while the portion of the file from the end of 110c through the end of 110e might be contained in another range. Each process then updates each of the ranges, performing the lock, read, update, write, and unlock sequence on each range in turn.

However, the above collective I/O data sieving algorithm may lead to lock contention when writing because each process writes its data into the file in the order that the data appears in the file. Thus, at the beginning of the data sieving process, all processes may try to access the first range of the file. However, only one process may lock this range at a time, so all other processes are blocked until the first process proceeds.

One approach taken to reduce this lock contention is to use smaller buffers (and hence more ranges), so that there are fewer processes competing to update each range in the file. But, this reduces overall I/O performance and is not effective when data from all processes is interleaved at fine granularity within the file.

Figure 2:
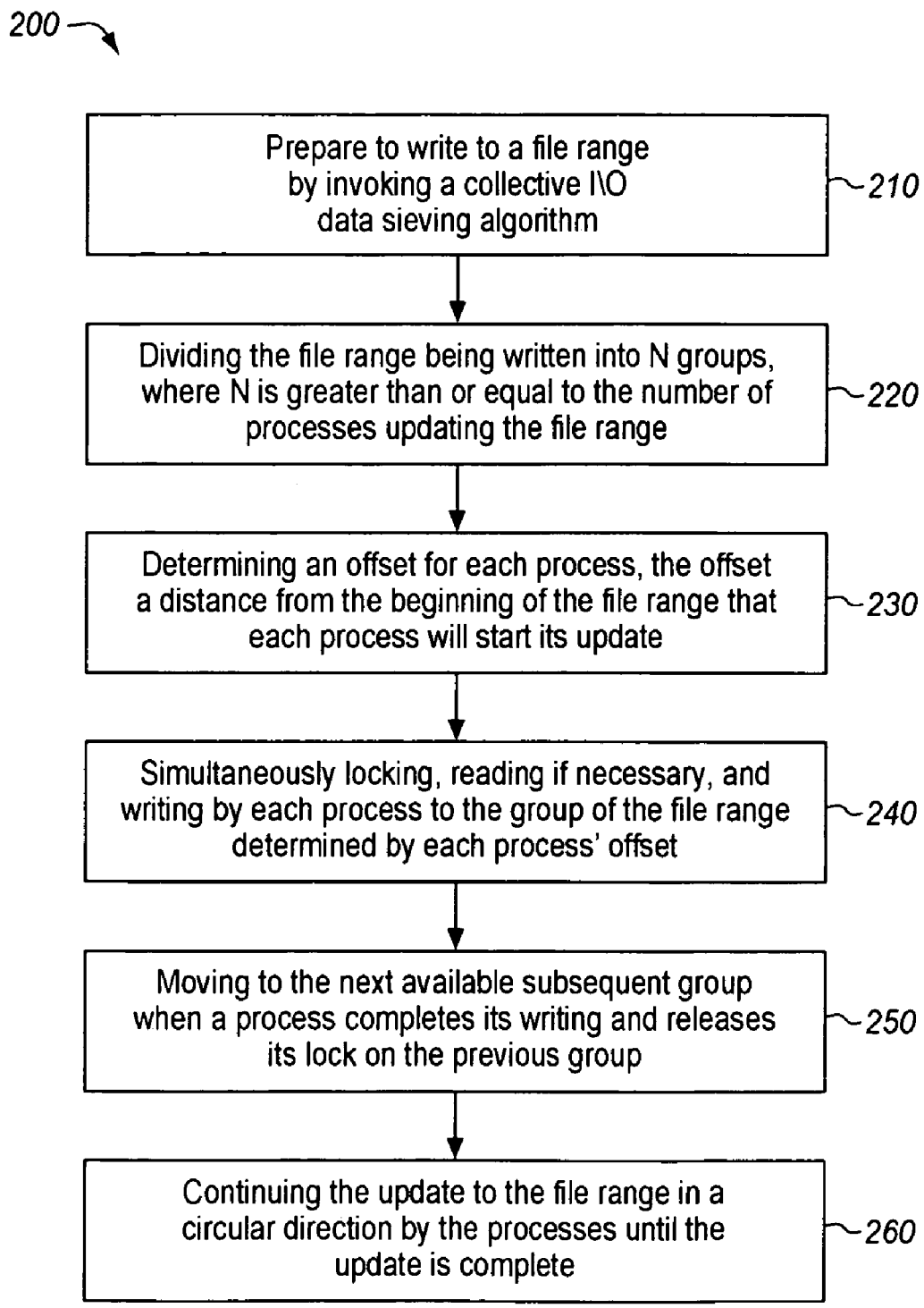
FIG. 2 is a flow diagram depicting a method of ring optimization for data sieving writes according to embodiments of the invention.

Embodiments of the invention utilize a ring optimization for data sieving writes to avoid the above-mentioned problems. FIG. 2 is a flow diagram depicting a method of ring optimization for data sieving writes according to embodiments of the invention. The ring optimization process 200 begins at processing block 210, where multiple processes of an application prepare to write to a file range by invoking a collective I/O data sieving algorithm. The collective I/O data sieving algorithm may be the same as discussed above with respect to FIG. 1.

At processing block 220, the file range being written is divided into N groups, where N is greater than or equal to the number of processes updating the file. In some embodiments, the ranges may be of variable size or alignment. For instance, they may be of a size to round the necessary buffer size to a value that is optimum for disk access. In one embodiment, the ranges do not overlap.

At processing block 230, an offset is determined for each process trying to update the file range. The offset defines a distance from the beginning of the file range at which each process may start its update. To avoid contention, the offset should be unique to each process. In some embodiments, the offset may be determined by a rank assigned to the particular process. For instance, a process may be assigned a rank when it is initialized as part of the parallel application.

At processing block 240, each process locks, reads if necessary, and begins updating the particular group of the file range associated with the offset assigned to each process. When a process completes its writing and releases its lock, it moves to the next subsequent available group at processing block 250. In some embodiments, a process may skip a group of the file range that is locked and return to that group at a later time.

Finally, at processing block 260, the update to the file continues by each process moving forward through the file in a circular fashion. For instance, when the end of the range is reached, a process may move to the start of the range and continues to write its updates into the file until it has updated all necessary groups. In some embodiments, a backward-stepping direction may be utilized. One skilled in the art will appreciate that any ordering direction that visits each group exactly once will also provide the benefits of the ring optimization of embodiments of the invention.

Figure 3A:
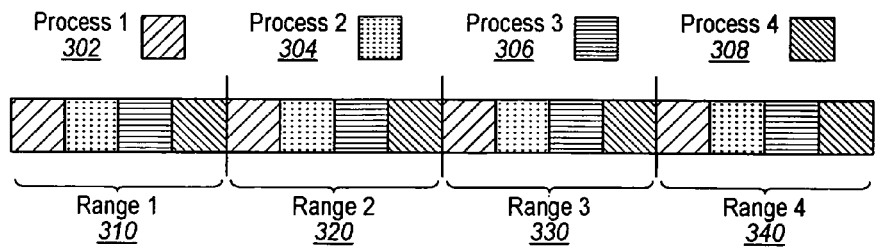
FIGS. 3A through 3E are block diagrams illustrating one embodiment of a step-by-step application of ring optimization for data sieving writes to a file.

FIGS. 3A through 3E are block diagrams illustrating one embodiment of a step-by-step application of ring optimization for data sieving writes to memory. In one embodiment, FIGS. 3A through 3E illustrate the application of process 200 described with respect to FIG. 2 to a file. FIG. 3A depicts a file write operation for multiple processes under a traditional data sieving approach, such as the one described with respect to FIG. 1. In this case, all four processes, 302, 304, 306, 308, would first try to write their data to range 1 310, followed by writes to range 2 320, range 3 330, and range 4 340 in sequential order, with each process attempting to update each range at the same time. This would lead to the above described lock contention problem.

Figure 3B:
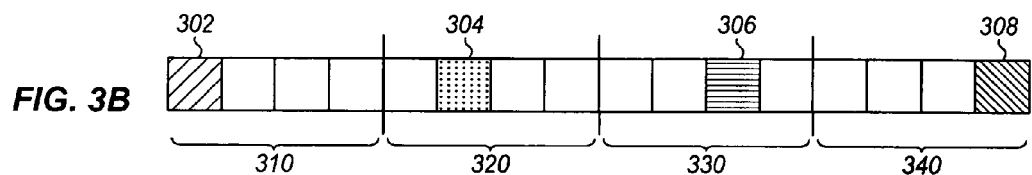

Under the ring optimization approach of embodiments of the invention, such as process 200 described with respect to FIG. 2, this lock contention problem is avoided. FIG. 3B depicts the initial starting point for the data sieving algorithm under a ring optimization approach. Process 1 302 would first write its data to range 1 310, while process 2 304 simultaneously writes to range 2 320, process 3 306 to range 3 330, and process 4 308 to range 4 340.

Figure 3C:
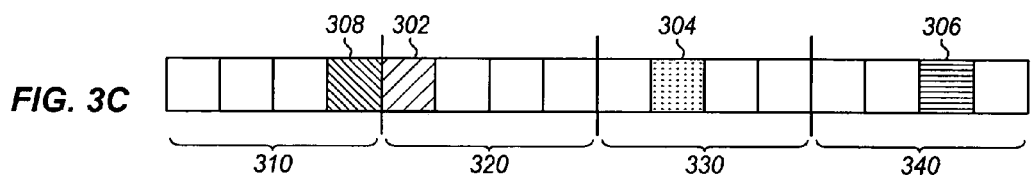
Figure 3D:
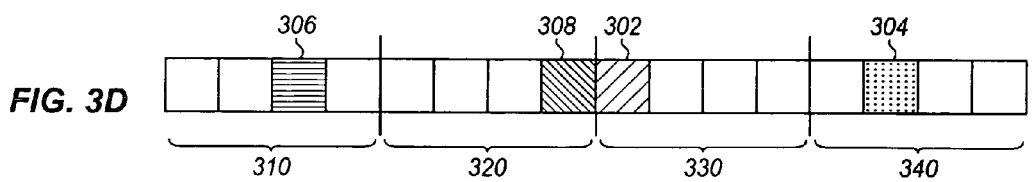
Figure 3E:
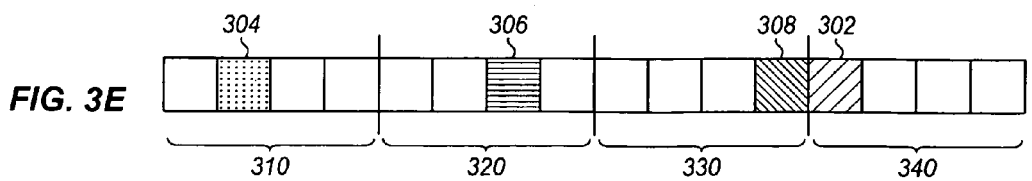

FIGS. 3C through 3E depict the remaining process for the ring optimization. FIGS. 3C, 3D, and 3E show how each process 302-308 continues on to the next available subsequent range 310-340 after they complete their previous write to a range, and then lock and begin writing the next range. As there is no requirement for the processes to start at a particular point in the data range or write in a particular order, this optimization allows lock contention to be avoided and write efficiency improved.

One skilled in the art will appreciate that the synchronization of writes in the ring optimization need not be in lock-step if multiple buffers are used within each range. In fact, explicit synchronization is not required between the processes at all. Logically, implicit synchronization results through the file range locks and the circular forward stepping of the processes through the ranges.

Figure 4:
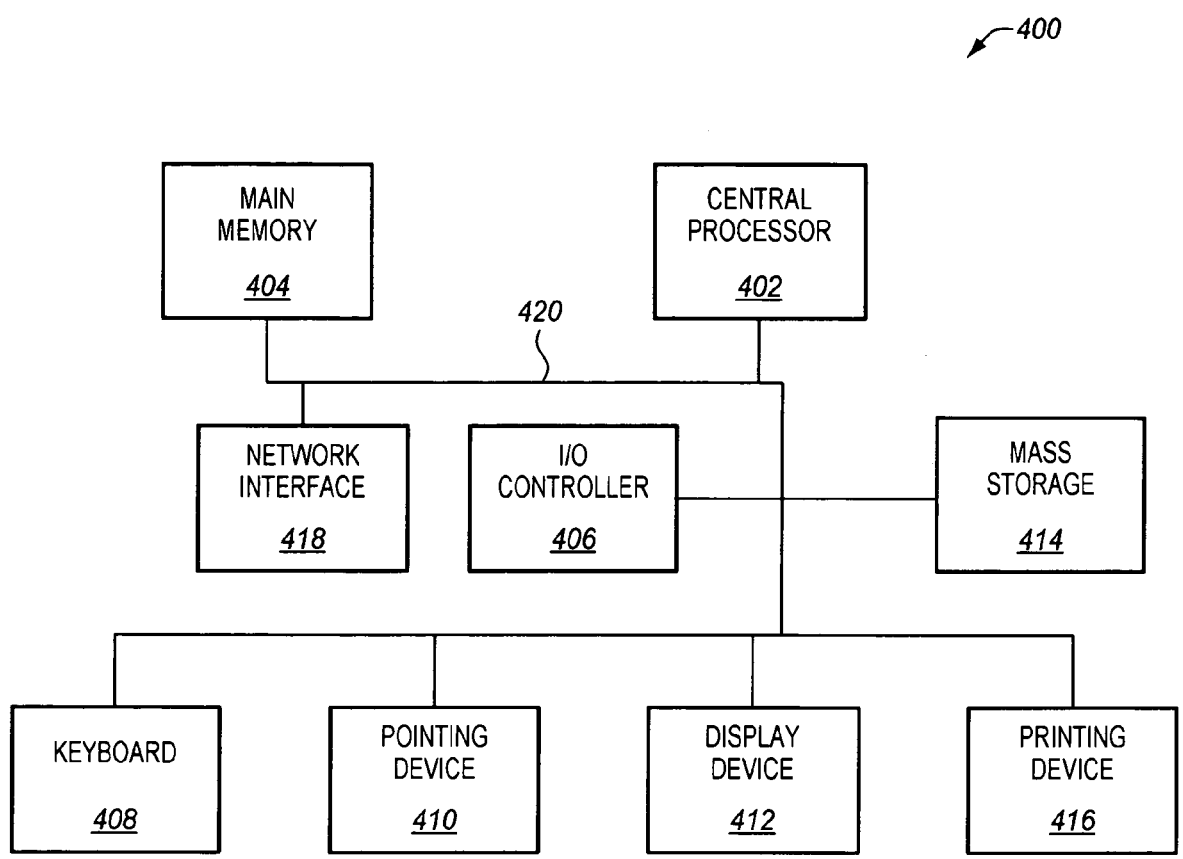
FIG. 4 is an illustration of an embodiment of a computer system.

FIG. 4 illustrates an exemplary computer system 400 in which certain embodiments of the present invention may be implemented. In one embodiment, the process of FIG. 2 may be implemented by system 400 or by components of system 400.

System 400 comprises a central processor 402, a main memory 404, an input/output (I/O) controller 406, a keyboard 408, a pointing device 410 (e.g., mouse, track ball, pen device, or the like), a display device 412, a mass storage 414 (e.g., a nonvolatile storage such as a hard disk, an optical drive, and the like), and a network interface 418. Additional input/output devices, such as a printing device 416, may be included in the system 400 as desired. As illustrated, the various components of the system 400 communicate through a system bus 420 or similar architecture.

In a further embodiment, system 400 may be a distributed computing system. In other words, one or more of the various components of the system 400 may be located in a physically separate location than the other components of the system 400. Such components may be accessed and connected via a network to the other components.

In accordance with an embodiment of the present invention, the computer system 400 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors.

Also, instead of a single processor, two or more processors (whether on a single chip or on separate chips) can be utilized to provide speedup in operations. It is further envisioned that the processor 402 may be a complex instruction set computer (CISC) microprocessor, a reduced instruction set computing (RISC) microprocessor, a very long instruction word (VLIW) microprocessor, a processor implementing a combination of instruction sets, and the like.

The network interface 418 provides communication capability with other computer systems on a same local network, on a different network connected via modems and the like to the present network, or to other computers across the Internet. In various embodiments of the present invention, the network interface 418 can be implemented utilizing technologies including, but not limited to, Ethernet, Fast Ethernet, Gigabit Ethernet (such as that covered by the Institute of Electrical and Electronics Engineers (IEEE) 801.1 standard), Infiniband, Myrinet, scalable coherent interconnect (SCI), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB 2), asynchronous transfer mode (ATM), satellite, cable modem, and/or FireWire.

Moreover, the computer system 400 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 400 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
  dividing a file range to be written to via a data sieving write operation into N groups, where N is greater than or equal to a number of processes writing to a memory;
  determining an offset assigned to each process, the offset being a distance from a beginning of the file range at which each process starts its writing;
  simultaneously writing by each process to the group of the file range determined by the associated offset of each process;

moving, by each process, to a next available subsequent group when a process completes the writing; and continuing the writing to the file range in at least one of a circular forward-stepping direction and circular backward-stepping direction by the processes until the writing is complete.

2. The method of claim 1, wherein the at least one of the circular forward-stepping direction and the backward-stepping direction includes returning to an opposite end of the file range once a process reaches an end of the file range.

3. The method of claim 1, wherein the simultaneous writing further comprises locking the group of the file range to deny access to the group by any other process.

4. The method of claim 3, wherein the locking and the circular forward-stepping direction create an implicit synchronization between the processes.

5. The method of claim 1, further comprising invoking, by the processes, a collective input/output (I/O) data sieving algorithm for a write operation.

6. The method of claim 1, wherein the moving to the next available subsequent group includes skipping a group that is locked by another process and returning to the locked group at a later time.

7. The method of claim 1, wherein the processes are part of a parallel computing application utilizing a Message Passing Interface (MPI) programming interface.

8. An article of manufacture, comprising a machine-accessible medium including data that, when accessed by a machine, cause the machine to perform operations comprising:

dividing a file range to be written to via a data sieving write operation into N groups, where N is greater than or equal to a number of processes writing to a memory;

determining an offset assigned to each process, the offset being a distance from a beginning of the file range at which each process starts its writing;

simultaneously writing by each process to the group of the file range determined by the associated offset of each process;

moving, by each process, to a next available subsequent group when a process completes the writing; and continuing the writing to the file range in at least one of a circular forward-stepping direction and circular backward-stepping direction by the processes until the writing is complete.

9. The article of manufacture of claim 8, wherein the at least one of the circular forward-stepping direction and the backward-stepping direction includes returning to an opposite end of the file range once a process reaches an end of the file range.

10. The article of manufacture of claim 8, wherein the simultaneous writing further comprises locking the group of the file range to deny access to the group by any other process.

11. The article of manufacture of claim 10, wherein the locking and the circular forward-stepping direction create an implicit synchronization between the processes.

12. The article of manufacture of claim 8, further comprising invoking, by the processes, a collective input/output (I/O) data sieving algorithm for a write operation.

13. The article of manufacture of claim 8, wherein the moving to the next available subsequent group includes skipping a group that is locked by another process and returning to the locked group at a later time.

14. The article of manufacture of claim 8, wherein the processes are part of a parallel computing application utilizing a Message Passing Interface (MPI) programming interface.

15. An apparatus, comprising:

a processor;

one or more processes accessing a file range via a collective input/output (I/O) data sieving algorithm; and an interface to a file, the interface to:

divide the file into N groups, where N is greater than or equal to a number of the one or more processes writing to the file;

determine an offset assigned to each process, the offset being a distance from a beginning of the file at which each process starts its writing;

simultaneously write by each process to the group of the file determined by the associated offset of each process;

move, by a process, to a next available subsequent group when the process completes its writing; and continue the writing to the file in at least one of a circular forward-stepping direction or a circular backward-stepping direction by the processes until the writing is complete.

16. The apparatus of claim 15, wherein the at least one of the circular forward-stepping direction or the circular backward-stepping direction includes returning to an opposite end of the file once a process reaches an end of the file.

17. The apparatus of claim 15, wherein the simultaneous writing further comprises locking the group of the file to deny access to the group by any other process.

* * * * *